United States Patent [19]

Flaxl

[11] Patent Number: 5,550,536

[45] Date of Patent: Aug. 27, 1996

[54] CIRCUIT FREQUENCY FOLLOWING TECHNIQUE TRANSPONDER RESONANT

[75] Inventor: Thomas J. Flaxl, Train, Germany

[73] Assignee: Texas Instruments Deutschland GmbH, Germany

[21] Appl. No.: 291,964

[22] Filed: Aug. 17, 1994

[51] Int. Cl.[6] .................................................. H04Q 9/12
[52] U.S. Cl. ........................... 340/825.540; 340/825.34; 342/42; 342/51
[58] Field of Search ...................... 340/825.34, 824.54, 340/941; 235/1 R; 342/42, 51

[56] References Cited

U.S. PATENT DOCUMENTS

| | | | |
|---|---|---|---|
| 3,970,824 | 7/1976 | Walton et al. | 342/42 |
| 4,333,072 | 6/1982 | Beigel | 340/825.54 |
| 4,752,776 | 6/1988 | Katzenstein | 340/825.34 |
| 5,019,813 | 5/1991 | Kip et al. | 342/51 |
| 5,041,826 | 8/1991 | Milheiser | 340/825.54 |
| 5,053,774 | 10/1991 | Schuermann et al. | 342/44 |
| 5,166,676 | 11/1992 | Milcheiser | 340/825.54 |
| 5,235,326 | 8/1993 | Beigel et al. | 340/825.34 |
| 5,245,332 | 9/1993 | Katzenstein | 340/825.54 |
| 5,287,113 | 2/1994 | Meier | 342/51 |
| 5,374,930 | 12/1994 | Schuermann | 342/51 |
| 5,410,315 | 4/1995 | Huber | 342/42 |
| 5,446,447 | 8/1995 | Carney et al. | 340/825.54 |

*Primary Examiner*—Michael Horabik
*Assistant Examiner*—William H. Wilson, Jr.
*Attorney, Agent, or Firm*—Brian C. McCormack; James C. Kesterson; Richard L. Donaldson

[57] ABSTRACT

A transponder system (10) includes an interrogation unit (12) that transmits a first frequency F1 representing a binary zero, and a second frequency F2, representing a binary one. These signals are transmitted from an interrogator resonant circuit (22) within a radio frequency module (16). The transponder system (10) also includes a transponder unit (14) that receives a transmit frequency signal (51) from the interrogation unit (12) at a transponder resonant circuit (42). The transponder resonant circuit (42) is tuned to the first frequency F1 and the second frequency F2. A transponder control module (44) detects a change in the transmit frequency signal (51) from the interrogation unit (12) by a decrease in the voltage amplitude with the transponder resonant circuit (42). The transponder control module (44) repositions a switch circuit (48) that connects and disconnects capacitors within the transponder resonant circuit (42) to match the frequency of the transponder resonant circuit (42) with the new transmit frequency signal (51).

17 Claims, 1 Drawing Sheet

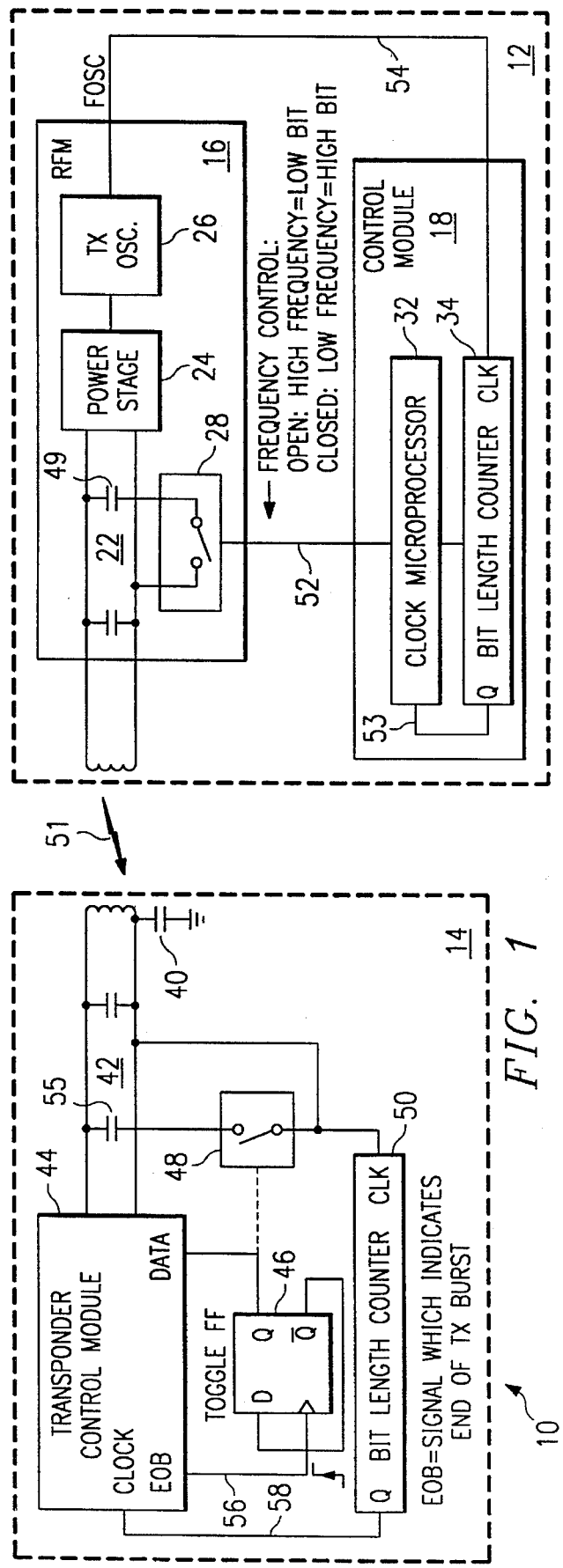
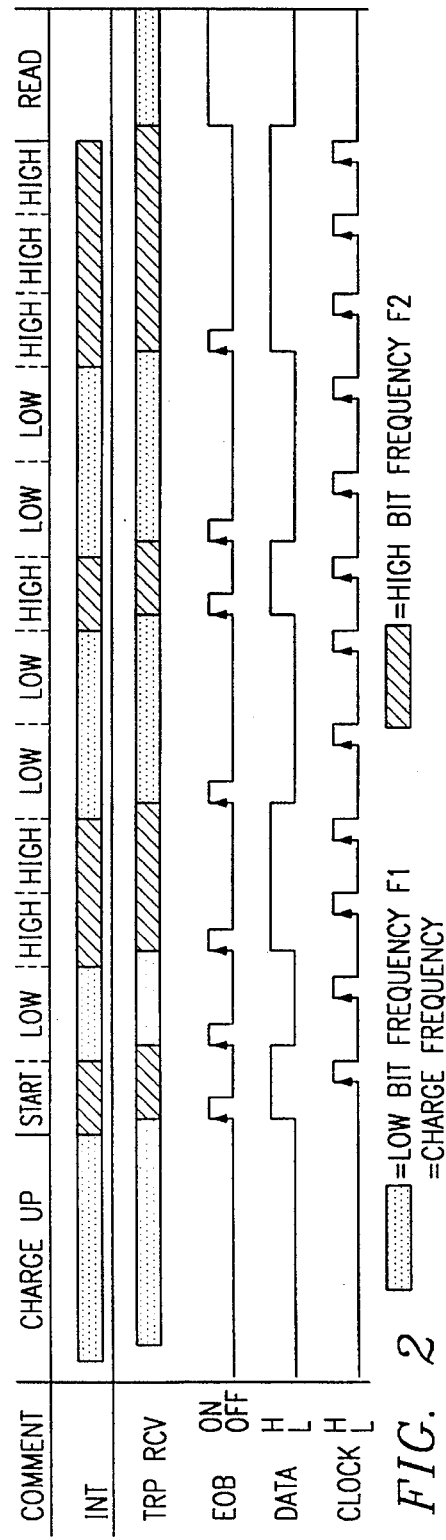
FIG. 1
FIG. 2

CIRCUIT FREQUENCY FOLLOWING TECHNIQUE TRANSPONDER RESONANT

TECHNICAL FIELD OF THE INVENTION

The present invention relates in general to transponder communications and more particularly to a method and apparatus for transferring information to a transponder.

BACKGROUND OF THE INVENTION

Interrogation units for transponder systems typically use amplitude modulation to transfer data from the interrogation unit to the transponder. Amplitude modulation requires high quality resonators at both the transponder and the interrogation units in order to achieve long read/write distances between the transponder and interrogator units. High quality factor resonators have long build up times, thus leading to slow data transmission rates. Further, maximum data transmission rates differ according to different quality factors of the resonator circuits at the transponder and interrogation units. Also, maximum data transmission rates differ according to the distance between the interrogation unit and the transponder unit. Therefore, it is desirable to increase the data transmission speed between an interrogation unit and a transponder unit while maintaining long read/write distances.

SUMMARY OF THE INVENTION

From the foregoing, it may be appreciated that a need has arisen for an interrogation unit and transponder system with increased data transmission rates. A need has also arisen for a transponder system that is independent of resonant circuit quality factors. Further, a need has arisen for interrogation and transponder units that avoid the build up times of high quality factor resonators.

In accordance with the present invention, a method and apparatus for transferring information to a transponder are provided that substantially eliminate or reduce disadvantages and problems associated with amplitude modulation transponder systems while maintaining long write distances.

According to an embodiment of the invention, there is provided a method of transferring information to a transponder that includes selecting a first frequency associated with digital data having a binary zero level state. A second frequency associated with the digital data having a binary one level state is also selected. Information corresponding to the digital data is transmitted by a transmit frequency signal. The transmit frequency signal is one of the first and second frequencies and information transmission occurs by changing the transmit frequency signal between the first and second frequencies according to the level state of the digital data. The resonance of the transponder is adjusted in response to the change in the frequency of the transmit frequency signal for efficient information transfer.

The present invention provides various technical advantages over amplitude modulation transponder systems. For example, one technical advantage is in the ability to transfer data to a transponder unit in a more efficient manner. Another technical advantage is in recognizing and following a change in the transmit frequency signal between the first and second frequencies without requiring high bandwidth low quality factor resonators that reduce effective transmission distance. Yet another technical advantage is in the avoidance of resonator build up times that can cause delay in data transmission. Still another technical advantage is in the ability to increase data transmission rates and the ability to maintain long read/write distances between the transponder and the interrogator as compared with amplitude modulation transmission systems. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a block diagram of a transponder unit and an interrogation unit in a transponder system; and FIG. 2 illustrates a timing diagram of the transferring of data from the interrogation unit to the transponder unit.

DETAILED DESCRIPTION OF THE INVENTION

FIG. 1 is a block diagram of a transponder system 10. Transponder system 10 includes an interrogation unit 12 and a transponder unit 14. Interrogation unit 12 includes a radio frequency module 16 and an interrogator control module 18. Radio frequency module 16 includes an interrogator resonant circuit 22, a power stage 24, an oscillator 26, and a switch circuit 28. Interrogator control module 18 includes a microprocessor 32 and an interrogator bit length counter 34. Transponder unit 14 includes a charge capacitor 40, a transponder resonant circuit 42, a transponder control module 44, a latch circuit 46, a switch circuit 48, and a transponder bit length counter 50. An example of a transponder system can be found in U.S. Pat. No. 5,053,774, issued Oct. 1, 1991, entitled "Transponder Arrangement" and hereby incorporated by reference herein.

In operation, radio frequency module 16 sends out a transmit frequency signal 51 from interrogator resonant circuit 22 according to a capacitor configuration within interrogator resonant circuit 22. Interrogator resonant circuit 22 includes a plurality of capacitors 49 and is able to generate one of two frequencies F1 and F2 for transmit frequency signal 51 according to the position of switch circuit 28. Switch circuit 28 is capable of connecting or disconnecting capacitors 49 within interrogator resonant circuit 22. With switch circuit 28 in the open position, interrogator resonant circuit 22 generates frequency F1 that represents a first data bit type having a binary zero level state. The open position of switch circuit 28 disconnects one or more capacitors 49 from interrogator resonant circuit 22 in order to achieve frequency F1. With switch circuit 28 in the closed position, interrogator resonant circuit 22 is able to generate frequency F2 that represents a second data bit type having a binary one level state. The closed position of switch circuit 28 connects additional capacitors 49 in interrogator resonant circuit 22 in order to achieve frequency F2. Interrogator resonant circuit 22 receives operational power from power stage 24. Oscillator 26 provides a reference frequency to drive interrogator resonant circuit 22 through power stage 24.

The open and closed position of switch circuit 28 is determined by interrogator control module 18. Interrogator control module 18 generates a frequency control signal 52 to drive switch circuit 28 of radio frequency module 16. Microprocessor 32 generates frequency control signal 52 according to the data bits of the desired information to be transmitted and in response to interrogator bit length counter 34 that establishes the bit length for each data bit type to be transmitted by frequencies F1 and F2 from radio frequency module 16. Bit length counter 34 provides a bit length clock signal 53 for microprocessor 32 in order to clock in the desired information at switch circuit 28. Microprocessor 32 also provides overall supervision of interrogation unit 12.

The bit length for each data bit type transferred to transponder unit 14 is fixed and is derived from a reference frequency signal 54 of oscillator 26. Reference frequency signal 54 from oscillator 26 drives a clock input of bit length counter 34. Bit length counter 34 counts a fixed number of cycles of reference frequency signal 54 to establish the bit length for each data bit transferred by transmit frequency signal 51. Since the bit length corresponds to a fixed number of cycles of reference frequency signal 54 of oscillator 26, the actual bit length of binary zero value data bits differs from the actual bit length of binary one value data bits. This is due to the different frequencies F1 and F2 used to transmit the information. Bit length counter 34 establishes a time period used by microprocessor 32 in controlling switch circuit 28 according to each data bit type and corresponding frequency for interrogator resonant circuit 22.

Transponder unit 14 receives a transmission from interrogation unit 12 through transponder resonant circuit 42. Transponder resonant circuit 42 is selectively tuned to one of the frequencies F1 and F2 according to a configuration of capacitors 55 such that transponder control module 44 can determine whether the received frequency from interrogation unit 12 is different than the frequency tuned within transponder resonant circuit 42. The frequency of transponder resonant circuit 42 is established through a switch circuit 48 that operates in a similar manner as switch circuit 28 of radio frequency module 16. Switch circuit 48 connects or disconnects capacitors 55 within transponder resonant circuit 42 to adjust the frequency within transponder resonant circuit 42 to either frequency F1 or frequency F2.

Upon detection of a frequency difference between transponder resonant circuit 42 and interrogator resonant circuit 22 due to a change in the frequency of the transmit frequency signal 51 of radio frequency module 16, transponder control module 44 generates an end of burst control signal 56 that indicates that there has been a frequency change. End of burst control signal 56 drives a latch circuit 46 that derives the digital data represented by transmitted frequencies F1 and F2. Latch circuit 46 also controls switch circuit 48 to adjust the frequency of transponder resonant circuit 42 to match the change in the frequency of the transmit frequency signal 51 at interrogator resonant circuit 22.

A frequency change in interrogator resonant circuit 22 of interrogation unit 12 causes a beat effect at transponder resonant circuit 42 of transponder unit 14. This beat effect occurs when there is a frequency difference between interrogator resonant circuit 22 and transponder resonant circuit 42. This beat effect causes a decrease in voltage amplitude at transponder resonant circuit 42. Transponder control module 44 recognizes this decrease in voltage amplitude and generates end of burst control signal 56 in response thereof. End of burst control signal 56 causes latch circuit 46 to toggle to a different state. The new state of latch circuit 46 forces switch circuit 48 to connect or disconnect additional capacitors 55 as required such that the frequency of transponder resonant circuit 42 matches the new frequency transmitted by interrogator resonant circuit 22. With this adjustment, resonant circuits 22 and 42 are again in resonance and the voltage at transponder resonant circuit 42 increases to its proper level.

With the next and all consecutive recognitions of voltage reduction at transponder resonant circuit 42 of transponder unit 14, transponder control module 44 through latch circuit 46 toggles again the resonance frequency of resonant circuit 42. In this manner, transponder unit 14 can detect a change in the frequency of the transmit frequency signal 51 at interrogation unit 12 and can respond to which frequency interrogation unit 12 is transmitting by following the change in frequency through resonance adjustment of transponder resonant circuit 42 to match the new frequency of transmit frequency signal 51 and return the voltage amplitude of transponder resonant circuit 42 to a proper level. A specific resonant circuit timing implementation can be found in copending U.S. patent application Ser. No. 08/083,810, entitled "Automatic Antenna Tuning Method" (Attorney Dkt No. TI-16666), commonly assigned with the present application to Texas Instruments Incorporation, and hereby incorporated by reference herein.

Latch circuit 46 determines the information transmitted by interrogation unit 12 in response to end of burst control signal 56. Transponder bit length counter 50 is used to synchronize the data bit detection of latch circuit 46 to the bit length derived in interrogation unit 12 and clock in the data bits at transponder control module 44. Bit length counter 50 counts the fixed number of cycles of transmit frequency signal 51 in order to generate a data clock signal 58. Transponder control module 44 uses data clock signal 58 to read the information generated at latch circuit 46.

FIG. 2 shows a timing diagram of an information transfer between interrogation unit 12 and transponder unit 14. Interrogation unit 12 initially sets up interrogator resonant circuit 22 to frequency F1 in order to charge up charge capacitor 40 of transponder unit 14. Charge capacitor 40 supplies operating power to transponder unit 14 without the need of internal or external power supply devices. After a desired charging time, control module 18 changes frequency control signal 52 to close switch circuit 28, setting interrogator resonant circuit 22 up with frequency F2. Radio frequency module 16 transmits frequency F2 to transponder unit 14 as an initiation pulse in order to start synchronization of frequency changes within transponder unit 14. Microprocessor 32 resets bit length counter 34 and transponder control module 44 resets bit length counter 50 to ready interrogator unit 12 and transponder unit 14 for the information transfer process. After transmission of the initiation pulse, interrogation unit 12 transmits the information according to a desired digital data pattern.

Though the bit length is based on a fixed number of cycles of oscillator 26, the actual bit lengths corresponding to frequencies F1 and F2 differ for the fixed number of cycles. Equalization is performed of the bit length of each data bit at transponder unit 14 with the bit length from interrogator unit 12 by deriving the bit length from the fixed number of cycles of transponder resonant circuit 42. Bit length counters 34 and 50 use the same value corresponding to the fixed number of cycles desired for transponder system 10. By using the fixed number of cycles, exact bit length synchronization occurs between transponder unit 14 and interrogation unit 12.

Transmit frequency signal 51 received at transponder resonant circuit 42 drives a clock input to bit length counter 50 in order to count the fixed number of cycles. After the fixed number of cycles has been counted, transponder bit length counter 50 generates data clock signal 58 in order to clock in the received data bit identified by latch circuit 46. The data clock signal 58 from bit length counter 50 is asynchronous because the counting of the fixed cycles occurs at different frequencies F1 and F2 of transmit frequency signal 51 according to the type of data bit received at transponder resonant circuit 42. After counting the fixed number of cycles for a data bit, transponder bit length counter 50 resets to begin counting the fixed number of cycles again in order to read in the next data bit. In this manner, data bits can be recovered through synchronization of bit lengths due to the fixed number of cycles between interrogator unit 12 and transponder unit 14.

For each change in frequency recognized by transponder resonant circuit 42 of transponder unit 14, end of burst control signal 56 is generated to toggle latch circuit 46. Latch circuit 46 generates the desired digital data pattern as transmitted by interrogation unit 12 in response to end of burst control signal 56. Latch circuit 46 adjusts the resonance of transponder resonant circuit 42 to match any frequency changes by driving switch circuit 48 as required. Transponder control module 44 receives data clock signal 58 from transponder bit length counter 50 in order to read in the data bits identified by latch circuit 46. The resonance frequency of transponder unit 14 follows the frequency changes at interrogation unit 12 to maintain the voltage amplitude of transponder resonant circuit 42 at a constant level and thus allows for maintaining of long read/write distances between interrogation unit 12 and transponder unit 14.

The use of frequency shift keying as described above normally requires a receiving unit with a high bandwidth in order to receive the two discrete signal frequencies. A high bandwidth would require that low quality factors be used in transponder resonant circuit 42. A low quality factor resonant circuit would decrease the distance between transponder unit 14 and interrogation unit 12 for effective communications. However, the frequency follow technique described above does not depend on resonant circuit quality factors, allowing for the maintenance of long read/write distances between transponder unit 12 and interrogation unit 14.

By maintaining the voltage amplitude at a proper level, transponder resonant circuit 42 does not require build up times that cause delay in data transmission and thus an increase in the data transmission rate is achieved. Without the necessity for build up times within transponder resonant circuit 42, there is an independence in the type of quality factors used within resonant circuits 22 and 42. This independence in the type of quality factor used also leads to an independence of data communication speed for different distances between interrogation unit 12 and transponder unit 14. Further, transponder unit 14 is powered during this whole transfer procedure, keeping charge capacitor 40 of transponder unit 14 charged. The charge maintenance of charged capacitor 40 within transponder unit 14 allows for a decrease in the amount of charge up time required at the beginning of a transfer procedure.

In summary, an interrogation unit of a transponder system transmits a transmit frequency signal having one of a first and second frequency, wherein the first frequency represents a binary zero level state for digital data and the second frequency represents a binary one level state for the digital data. The desired transmit frequency signal is generated at an interrogator resonant circuit within a radio frequency module and the desired frequency for the transmit frequency signal is determined by an interrogator control module that controls a switch circuit which connects or disconnects capacitors within the interrogator resonant circuit as required for the desired frequency. The interrogator control module also establishes the bit length for each data bit type to be transmitted by the interrogation unit via the appropriate frequency.

A transponder unit has a transponder resonant circuit similar to the interrogation resonant circuit that receives the transmit frequency signal from the interrogation unit. A transponder control module monitors the transponder resonant circuit to determine whether there has been change in the frequency of the transmit frequency signal from the interrogation unit. A reduction in voltage amplitude of the transponder resonant circuit establishes that a change in frequency has occurred and the transponder control module generates an end of burst control signal corresponding to the change in the frequency of the transmit frequency signal. The end of burst control signal drives a latch circuit that determines the digital data transferred by the interrogation unit and controls a switch circuit that connects or disconnects capacitors within the transponder resonant circuit in order to match the frequency resonance of the transponder resonant circuit within the transponder unit to the change in frequency of the transmit frequency signal from the interrogation unit.

When the frequency of the transponder resonant circuit of the transponder unit corresponds to the new transmit frequency signal, the voltage amplitude of the transponder resonant circuit returns to its normal operation level and the transponder control module removes the end of burst control signal. A bit length counter within the transponder unit equalizes the bit length of the new data bit type as established by the interrogator control module of the interrogation unit and provides a data clock signal to read in the data bits identified by the latch circuit.

Thus, it is apparent that there has been provided, in accordance with the present invention, a method and apparatus for transferring information to a transponder that satisfies the advantages set forth above. Although the preferred embodiment has been described in detail, it should be understood that various changes, substitutions, and alterations can be made herein. For example, though frequency changes are detected by a change in amplitude at a given impedance, frequency changes may also be detected by a change in phase, signal period measuring, or any other suitable method. Another example is that adjustments to the resonant circuits can be made by adaptively changing the size of capacitors in order to change between frequencies. Other examples are readily ascertainable by one skilled in the art and could be made without departing from the spirit and scope of the present invention as defined by the following claims.

What is claimed is:

1. A method of transferring information to a transponder, comprising the steps of:

selecting a first frequency associated with data bits of information having a binary zero level state;

selecting a second frequency associated with data bits of information having a binary one level state;

transmitting information corresponding to the digital data with a transmit frequency signal, said transmitting step including the step of changing a frequency of the transmit frequency signal between the first and second frequencies according to a binary level state of the information;

detecting the change in the frequency of the transmit frequency signal at the transponder; and tuning said transponder resonant circuit to approximately said first frequency when the frequency of said transmit frequency signal is said first frequency, and tuning said transponder resonant circuit to approximately said second frequency when the frequency of said transmit frequency signal is said second frequency.

2. The method of claim 1, wherein said detecting step includes recognizing a decrease in voltage amplitude at the transponder, the decrease in voltage amplitude being indicative of a change in the frequency of the transmit frequency signal.

3. The method of claim 1, wherein said detecting step includes recognizing a change in phase at the transponder, the change in phase being indicative of a change in the frequency of the transmit frequency signal.

4. The method of claim 1, further comprising the step of:

determining a transmit bit length for each data bit of information transmitted to the transponder, the transmit bit length establishing a time period during which each data bit is transmitted by the transmit frequency signal.

5. The method of claim 4, further comprising the step of:

synchronizing the transmit bit length with a receive bit length at the transponder.

6. The method of claim 5, further comprising the step of:

deriving the receive bit length from a fixed number of cycles of the resonance of the transponder.

7. The method of claim 4, wherein the frequency of the transmit frequency signal is changed at a start of each new time period established by the transmit bit length in response to a change in the binary level state of each new data bit.

8. A transponder unit operable to receive information, comprising:

a transponder resonant circuit operable to receive a transmit frequency signal, said transponder resonant circuit being tuned to a first frequency and a second frequency, said transmit frequency signal being one of said first and second frequencies, said first and second frequencies representing information in binary zero and binary one level states respectively, said transmit frequency signal further operable to supply power to the transponder unit; and a transponder control module coupled to said transponder resonant circuit and operable to detect a change in a frequency of said transmit frequency signal between said first and second frequencies, and to tune said transponder resonant circuit to approximately said first frequency when the frequency of said transmit frequency signal is said first frequency, and to tune said transponder resonant circuit to approximately said second frequency when the frequency of said transmit frequency signal is said second frequency.

9. The transponder unit of claim 8, wherein said transponder control module is operable to sense a decrease in voltage amplitude at said transponder resonant circuit to detect said change in said frequency of said transmit frequency signal.

10. The transponder unit of claim 8, wherein said transponder control module is operable to sense a change in phase at said transponder resonant circuit to detect said change in said frequency of said transmit frequency signal.

11. The transponder unit of claim 8, further comprising:

a latch circuit operable to generate digital data in response to said change in said frequency of said transmit frequency signal.

12. The transponder unit of claim 11, wherein said latch circuit is operable to generate a switch signal to adjust said resonance of said resonant circuit to match said change in said frequency of said transmit frequency signal.

13. The transponder unit of claim 8, further comprising:

a switch circuit coupled to said transponder resonant circuit, said switch circuit operable to tune said transponder resonant circuit to one of said first and second frequencies in response to said change in said frequency of said transmit frequency signal.

14. The transponder unit of claim 13, wherein said transponder resonant circuit includes a plurality of capacitors, said switch circuit operable to connect and disconnect said capacitors to and from said transponder resonant circuit to select one of said first and second frequencies.

15. The transponder unit of claim 8, further comprising:

a bit length counter coupled to said transponder resonant circuit and operable to identify a bit length for each data bit of information received by said transponder resonant circuit via said transmit frequency signal.

16. The transponder unit of claim 15, where said bit length is derived from a fixed number of cycles of said transmit frequency signal.

17. The transponder unit of claim 15, wherein said bit length counter provides a bit length clock signal to said transponder control module to synchronize each data bit of information received at said transponder resonant circuit.

* * * * *